B. A. STONE.
CUTTING TOOL.
APPLICATION FILED SEPT. 22, 1919.
1,368,070.
Patented Feb. 8, 1921.
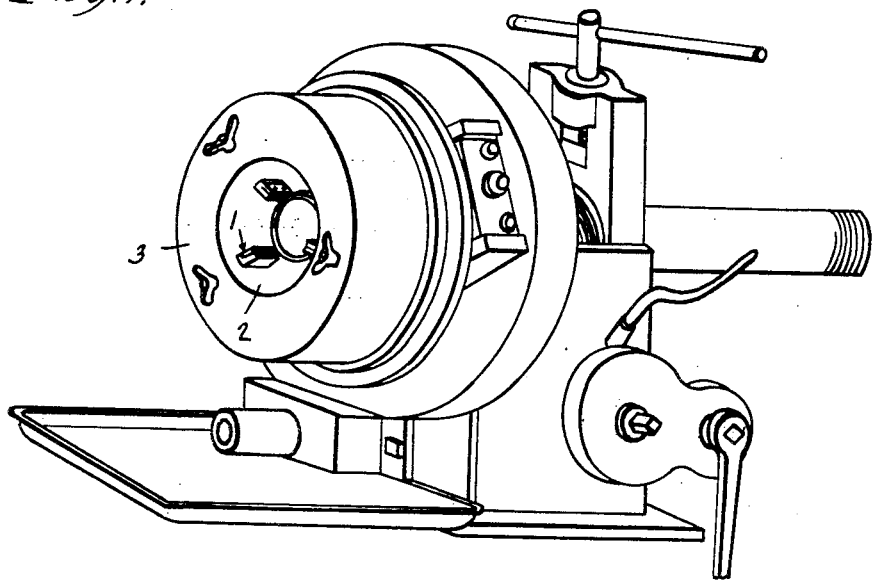
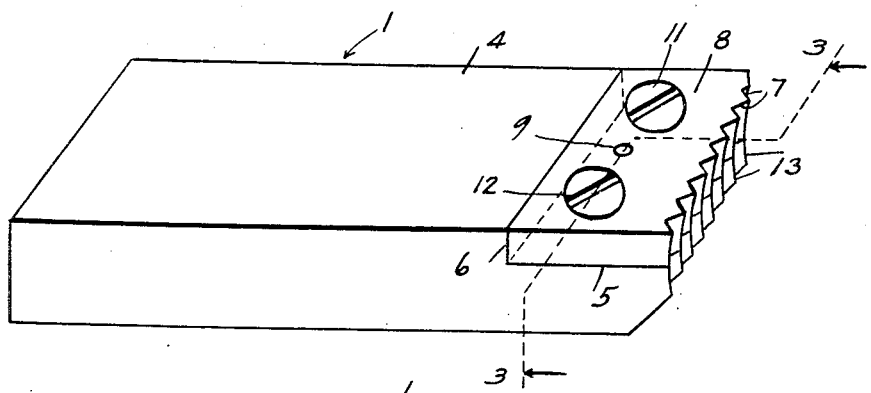
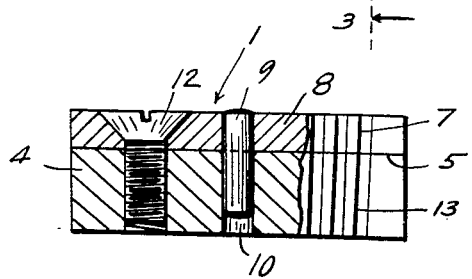
INVENTOR.
B. A. Stone,
BY Hazard & Miller
ATTORNEYS.

UNITED STATES PATENT OFFICE.

BYRON A. STONE, OF LONG BEACH, CALIFORNIA.

CUTTING-TOOL.

1,368,070.    Specification of Letters Patent.    Patented Feb. 8, 1921.

Application filed September 22, 1919. Serial No. 325,564.

*To all whom it may concern:*

Be it known that I, BYRON A. STONE, a citizen of the United States, residing at Long Beach, in the county of Los Angeles and State of California, have invented new and useful Improvements in Cutting-Tools, of which the following is a specification.

My invention relates to cutting tools and consists of the novel features herein shown, described and claimed.

My object is to make a cutting tool and especially a thread cutter in which the body of the cutting tool may be common steel and in which the cutting edges are formed upon a piece of high speed steel firmly joined to the piece of common steel.

Figure 1 is a perspective of a thread cutting machine provided with cutting tools in accordance with the principles of my invention.

Fig. 2 is a perspective of one of the cutting tools.

Fig. 3 is a cross section on the line 3—3 of Fig. 2.

Referring to Fig. 1, the cutting tools 1 are arranged radially and project inwardly from the inner face 2 of the tool head 3 as required to cut threads on pipe and the like.

Referring to Figs. 2 and 3, the cutting tool 1 comprises a body 4 of common steel and having a supporting face 5 and a backing face 6. The cutting edges 7 are formed upon a piece 8 of high speed steel and the piece 8 fits upon the supporting face 5 against the backing face 6. A hard dowel 9 is inserted through the central portion of the high speed steel 8 and fits tightly in a hole 10 extending downwardly from the face 5 of the common steel 4. Flat head screws 11 and 12 are inserted downwardly through the high speed steel 8 and tapped into the common steel 4, the heads of the screws being recessed into the high speed steel so as to make the finished tool smooth.

The cutting edges 7 shown are for making screw-threads, and in forming the cutting edges 7 the end face of the body 4 is correspondingly cut to make the supporting ledges 13 under the cutting edges 7 to support and strengthen the high speed steel 8.

The cutting tool 1 thus produced has all the advantages of high speed steel and only uses a very small piece of high speed steel. When the cutting edges 7 become worn or broken the screws 11 and 12 may be removed and the piece of high speed steel 8 removed and a new piece substituted.

Heretofore it has been impractical to make cutting tools of this kind of high speed steel for the reason that to make a tool of this size all of high speed steel would be unreasonably expensive.

Various changes may be made without departing from the spirit of my invention as claimed.

I claim:

1. A cutting tool comprising a piece of common steel having a supporting face and a backing face, a piece of high speed steel fitting upon the supporting face against the backing face, a dowel extending through the piece of high speed steel into the common steel, flat head screws inserted downwardly through the high speed steel and tapped into the common steel, and thread cutting edges formed upon the high speed steel with the grooves between the cutting edges extending through the common steel thereby forming supporting ledges for the thread cutting edges.

2. A cutting tool comprising a body portion of common steel having a supporting face and a backing face, a piece of high speed steel removably fitting upon the supporting face against the backing face and secured thereto by removable means, a cutting edge or edges formed upon the edge of the high speed steel and a corresponding edge or edges formed upon the common steel to reinforce and support said cutting edge or edges in a plane parallel to the cut.

In testimony whereof I have signed my name to this specification.

B. A. STONE.